United States Patent
Hoffner et al.

(10) Patent No.: US 10,210,225 B2
(45) Date of Patent: Feb. 19, 2019

(54) CONTROLLING INTERACTIONS BETWEEN AN APPLICATION USER INTERFACE AND A DATABASE

(71) Applicant: SAP SE, Walldorf (DE)

(72) Inventors: Andreas Hoffner, Waghäusel (DE); Marcel Waechter, Graben-Neudorf (DE)

(73) Assignee: SAP SE, Walldorf (DE)

( * ) Notice: Subject to any disclaimer, the term of this patent is extended or adjusted under 35 U.S.C. 154(b) by 663 days.

(21) Appl. No.: 14/849,600

(22) Filed: Sep. 10, 2015

(65) Prior Publication Data

US 2017/0075902 A1  Mar. 16, 2017

(51) Int. Cl.
   *G06F 17/30* (2006.01)

(52) U.S. Cl.
   CPC .... *G06F 17/3056* (2013.01); *G06F 17/30371* (2013.01)

(58) Field of Classification Search
   CPC .................. G06F 17/3056; G06F 17/30371
   See application file for complete search history.

(56) References Cited

U.S. PATENT DOCUMENTS

| | | | |
|---|---|---|---|
| 6,834,290 B1 * | 12/2004 | Pugh | G06F 17/30339 707/803 |
| 7,660,879 B2 * | 2/2010 | Srinivasan | G06F 8/60 709/205 |
| 2004/0205694 A1 * | 10/2004 | James | G06F 17/2247 717/104 |
| 2014/0380139 A1 * | 12/2014 | Mondri | G06F 17/246 715/212 |
| 2017/0004154 A1 * | 1/2017 | Blumenau | G06F 17/30309 |
| 2017/0024445 A1 * | 1/2017 | Schoppe | G06F 8/71 |

* cited by examiner

*Primary Examiner* — Kris E Mackes
*Assistant Examiner* — Tiffany Thuy Bui
(74) *Attorney, Agent, or Firm* — Buckley, Maschoff & Talwalkar LLC

(57) ABSTRACT

Various embodiments of systems and methods to control interactions between an application user interface and a database are described herein. In one aspect, a secondary persistency of application data is generated based on a primary persistency of the application data in a database. A request to modify a value of a field of the application data in the secondary persistency is received from the application user interface. The field of the application data in the secondary persistency is updated in response to the received request for modification. A determination is made that the received request for modification influences other fields of the application data according to a set of rules. The other fields of the application data are updated based on the received request. The application data in the secondary persistency is then transitioned to the primary persistency upon request.

18 Claims, 7 Drawing Sheets

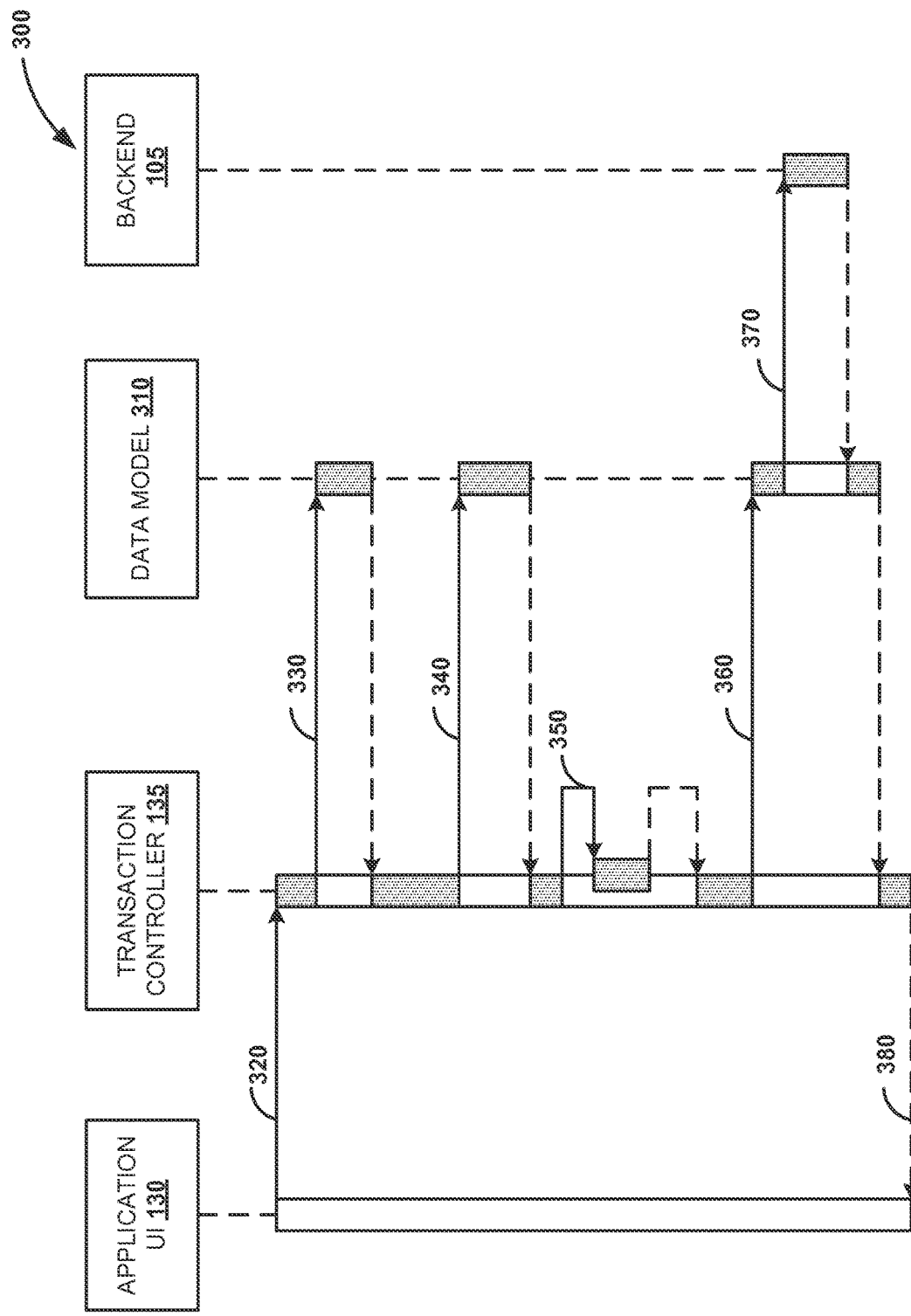

CONTROLLING INTERACTIONS BETWEEN AN APPLICATION USER INTERFACE AND A DATABASE

FIELD

Embodiments generally relate to computer systems and software, and more particularly to methods and systems to control interactions between an application user interface and a database.

BACKGROUND

Web-based applications provide end users access to various services and content, and are accessible on public and privates networks. Web-based applications may be deployed as part of a web architecture that includes backend databases for storing application data and user data. Interactions between a user interface of a web-based application and a backend database may be carried out using a stateless communications protocol, where the backend database does not retain session information. In other words, one interaction between the backend database and the user interface using the stateless communications protocol is independent of another interaction between the same backend database and user interface.

Application developers may utilize a user interface (UI) development toolkit as a platform to access various development tools for developing user interfaces for the web-based applications. At present, individual technical client components of several UI development toolkits lack techniques for orchestrating and managing transactions of web-based applications in a stateless communication environment. Since session information is not maintained in the stateless communication environment, the application developers may need to code manually, and may need to consider characteristics, such as task sequence, semantics of actions related to tasks, etc., for effective handling of the web-based applications. Moreover, manual interventions for controlling interactions between user interfaces and backend databases may not only lead to redundant code, but also to different behaviors for different applications and/or different implementations.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

FIG. 3 is a sequence diagram illustrating exemplary interactions between an application user interface (UI) and a database to generate a secondary persistency of application data, according to an embodiment.

DETAILED DESCRIPTION

Embodiments of techniques to control interactions between an application user interface and a database are described herein. References throughout this specification to "an embodiment", "this embodiment" and similar phrases, mean that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
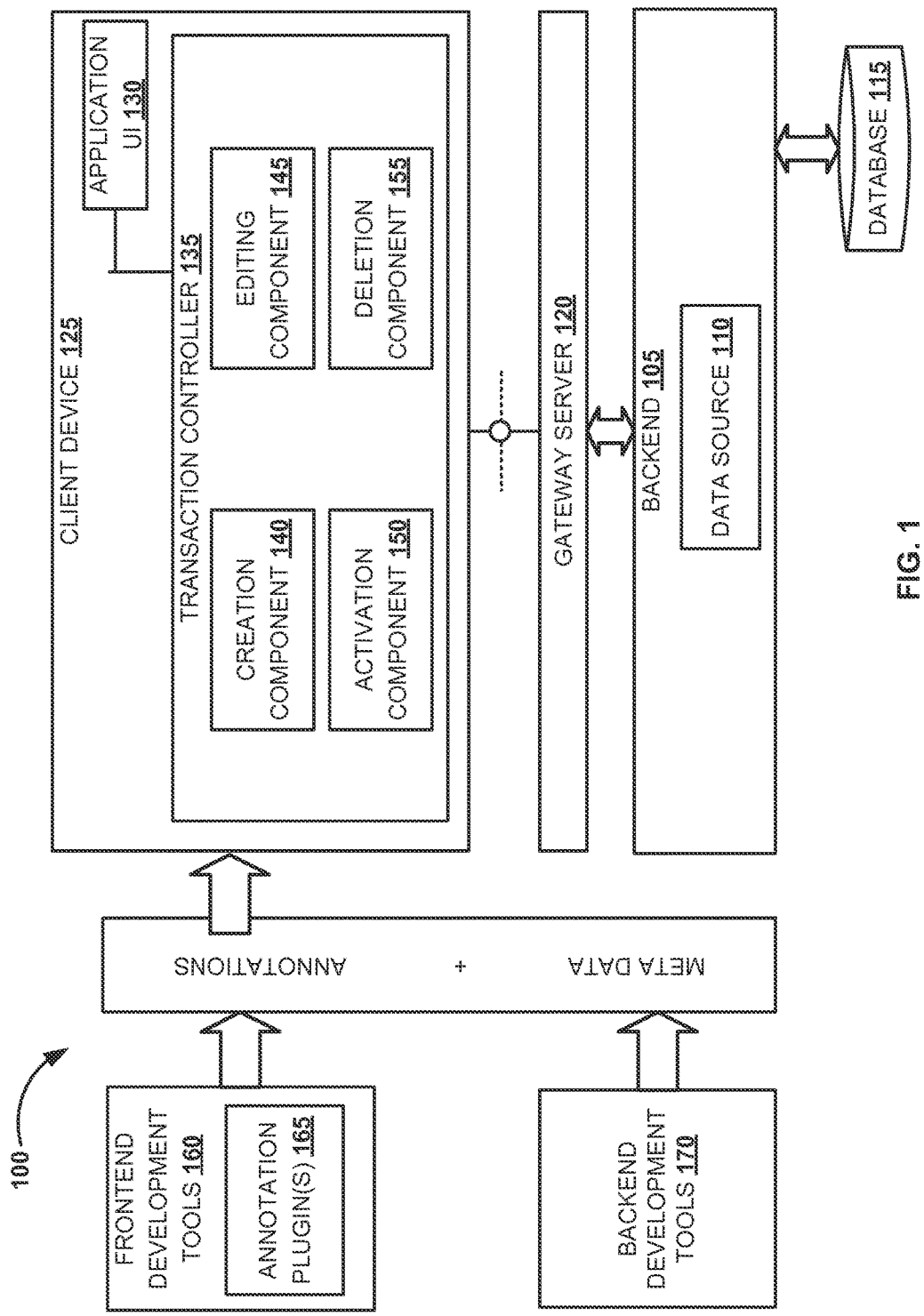
FIG. 1 is a block diagram illustrating an example system to control interactions between an application user interface and a database, according to an embodiment.

FIG. 1 is a block diagram illustrating example system 100 to control interactions between an application user interface and a database, according to an embodiment. The system 100 may include backend 105, database 115 storing data associated with the backend 105, gateway server 120 serving as an interface between the backend 105 and one or more client devices (e.g. 125).

The backend 105 may be a server that executes business applications corresponding to one or more services, where a portion of the business applications is executed based on requests received from and responses sent to client devices (e.g. 125). The backend 105 may include a web server that executes web-based applications. The web-based applications may be accessed by the client devices (e.g. 125) via a network or directly at the backend 105, to perform tasks or operations of the business applications. The backend 105 may include an electronic computing device operable to receive, transmit, process, store, and/or manage data and information associated with the business applications. The backend 105 may communicate with the database 115 to store various business objects, application data and user data, and other data, such as, tables, web pages, and the like associated with the backend 105. Although the database 115 is illustrated as an external entity, in some implementations, the database 115 may be an integral part of the backend 105.

As used herein, a business object can be a representation of an intelligible business entity, such as but not limited to a sales order, a financial report, an invoice and an account. The business object may encompass both functions and data, e.g., functions in the form of methods and data such as application data. A business object can be a target of a request for data in a particular application, for example, through a web page, and may define a view to be displayed when the business object is accessed. In an example, the business object is stored in a primary persistency of the database 115. As used herein, application data may refer to the data associated with one or more business objects of a web-based application and the views of the user interface corresponding to the business objects. The data associated with a business object may include multiple fields. The fields may include simple fields and annotated fields. A simple field refers to a field that does not influence values of other fields of the application data when a value of the field is modified. An annotated field refers to a field that influences values of other fields based on a modification of the value of the field.

The gateway server 120 acts as interface or gateway between the client devices (e.g. 125) and the backend 105. The client devices (e.g. 125) may access the backend 105 through the gateway server 120. The client devices (e.g. 125) may communicate with the gateway server 120 using Open Data (OData®) protocol through hypertext transfer protocol (HTTP) or hypertext transfer protocol secure (HTTPS) requests. Open Data (OData) protocol is a web protocol for accessing, querying and updating data, and allows an end user and/or a developer to request and receive data from the database 115. In an example, the gateway server 120 is a hardware server, a software server, and/or a virtual server. In another implementation, the gateway server 120 is an integral part of the backend 105, or the functionalities of the gateway server 120 may be configured in the backend 105, without the need for a distinct gateway server 120.

The client device 125 may include a computing device operable to connect to and/or communicate with the backend 105 via the gateway server 120 over a network using a wireline or wireless connection. The client device 125 may be an electronic computing device operable to receive, transmit, process, and store appropriate data associated with the system 100. The client device 125 further includes a client application. The client application may be or may include a web browser. The client device 125 further includes a graphical user interface (GUI). The GUI is configured to generate a visual representation of the web browser. For example, the GUI is used to render a user interface 130 associated with a web-based application stored on the backend 105.

In an embodiment, a processor is configured to read and execute instructions stored in one or more memory elements. The one or more memory elements store instructions to execute the functionalities of transaction controller 135. Referring to FIG. 1, the transaction controller 135 may include a plurality of components (e.g. 140, 145, 150, and 155) representing one or more application programming interfaces to perform a process, according to one embodiment. The transaction controller 135 provides a set of application programming interfaces (APIs) for orchestrating and managing the transaction handling of draft-enabled web applications. As used herein, "draft-enabled" refers to the ability to maintain a secondary persistency or secondary data storage for the application content or application data on the database 115 in addition to the primary persistency of active business data. In an embodiment, the primary persistency is a database persistency that stores the application data for active usage, and can be accessed by end users of the web-based application. A draft-enabled web application allows the developer to save a data snapshot or an intermediate state of the application data, also referred to herein as a draft, in the secondary persistency and to continue working on the draft. In an embodiment, the secondary persistency is a temporary storage in the database 115 for drafts of the application data. The secondary persistency allows the developer to make changes to the draft of the application data without affecting the active business data on the primary persistency, thereby avoiding application downtimes. In an embodiment, creation component 140 generates the draft of application data based on the primary persistency of the application data in the database 115. As used herein, the draft of the application data refers to the application data stored in the secondary persistency of the database 115.

In an embodiment, the backend 105 and/or the database 115 is associated with a data model corresponding to the application data, for example, a data model based on OData protocol. Upon generating the draft of the application data, the creation component 140 refreshes the data model to add a document tree corresponding to the draft of the application data to the data model.

Editing component 145 receives a request to modify a value of a field of the application data in the secondary persistency. The editing component 145 may receive the request from a computer generated user interface, e.g., the application UI 130 at the client device 125. The editing component 145 causes the field to be updated based on the received request. The editing component 145 determines whether modifying the value of the field based on the received request influences the values in other fields of the application data according to a set of rules on the backend 105. In an embodiment, the editing component 145 determines whether the field of the application data is annotated with a predefined annotation using the annotations document. When the field is annotated, the editing component 145 determines that the request for modification influences other fields of the application data according to the set of rules. The set of rules may include determination rules associated with the backend 105. When the editing component 145 determines that modifying the value of the field to be modified influences the values in other fields of the application data, the editing component 145 updates the other fields based on the request. When the editing component 145 determines that modifying the value in the field to be modified does not influence the values in the other fields of the application data, the editing component 145 updates only the field to be modified based on the request.

After the modification, the end user may decide to transfer the draft of the application data to the active business data in the primary persistency through an activation step. Activation component 150 transitions the draft of the application data from the secondary persistency to the primary persistency. In an embodiment, the activation component 150 transitions the draft of the application data to the primary persistency in response to an activation request from a developer via the application UI 130. The activation request moves the draft of the application data from the secondary persistency to active business data on the primary persistency. The draft that is moved from the secondary persistency to the active business data on the primary persistency is herein referred to as an activated document. In an embodiment, when the draft of the application data is transitioned to the primary persistency, the transaction controller 135 deletes the document tree corresponding to the draft from the data model. The transaction controller 135 then adds the activated document corresponding to the transitioned application data to the data model.

In an embodiment, the transaction controller 135 transmits a request to the database 115 to validate the changes to the other fields of the application data. In response to the request, the transaction controller 135 receives a response indicating whether the changes are validated. In an example, the request to the database 115 to validate the changes is a HTTP read request.

Deletion component 155 is configured to delete the draft from the secondary persistency, e.g., upon user request or other event. When the draft is deleted, the deletion component 155 may request a refresh of the data model to delete the document tree corresponding to the draft from the data model.

In an embodiment, the transaction controller 135 groups a set of operations corresponding to one or more requests to be sent to the database 115 in a logical unit of work to create a batch request. The batch request is then added to a request queue to transmit the batch request to the database 115. The transaction controller 135 may also block the application UI 130 of an application that accesses the database 115, to prevent changes to the application data for a predefined period of time when the batch request is added to the request queue. In an embodiment, the transaction controller 135 validates the modification to the value of the field at client side prior to transmitting the request to modify the field to the database 115. The transaction controller 135 prevents the request for modification from being transmitted to the database 115 if errors are identified in response to the validation.

The transaction controller 135 provides a set of APIs to ensure atomicity of operations to be sent to the backend 105 considering the behavior of draft-enabled web applications, such as, evaluation of common annotations associated with the business objects. Atomicity ensures that a Series of operations to be executed are treated as "indivisible", and prevents partial execution of the series of operations. The transaction controller 135 may be made available through a library in a user interface development layer for a markup language. The transaction controller 135 may be realized as a JavaScript® class that can be reused by markup language-based applications for draft-enabled and non-draft-enabled applications. In an exemplary implementation, the transaction controller 135 is hosted in a client application of the client device 125. For example, the transaction controller 135 is hosted in the web browser of the client device 125. Although FIG. 1 depicts the transaction controller 135 being hosted in the client device 125, the transaction controller 135 may be implemented on other elements and/or components of the system 100.

Frontend development tools 160 and backend development tools 170 are sources of metadata and annotations associated with the business objects stored in the database 115 of the backend 105. In an example, the annotations are provided in the form of an annotations document. The frontend development tools 160 may include browser-based development tools for developing user interface views of the web-based applications in browser-based development environments. The backend development tools 170 may include tools for developing the web-based applications. The frontend development tools 160 further include annotation plugin 165. The annotation plugin 165 is used for design time purposes and helps the developer to define the annotations (e.g. in graphical way) that are later consumed by the UI, e.g., the transaction controller 135. The result from the annotation plugin 165 is either stored as extensible markup language (XML) resource in a UI application deliverable or stored in the backend 105 either as an additional data source or directly embedded to a data source 110 e.g. to underlying core data services (CDS) views.

The backend 105, the database 115 and the gateway server 120 may represent the "model" in a model-view-controller (MVC) architecture. The application user interface 130 at the client device 125 may represent the "view" of the MVC architecture, and the transaction controller 135 may represent the "controller" of the MVC architecture.

Figure 2:
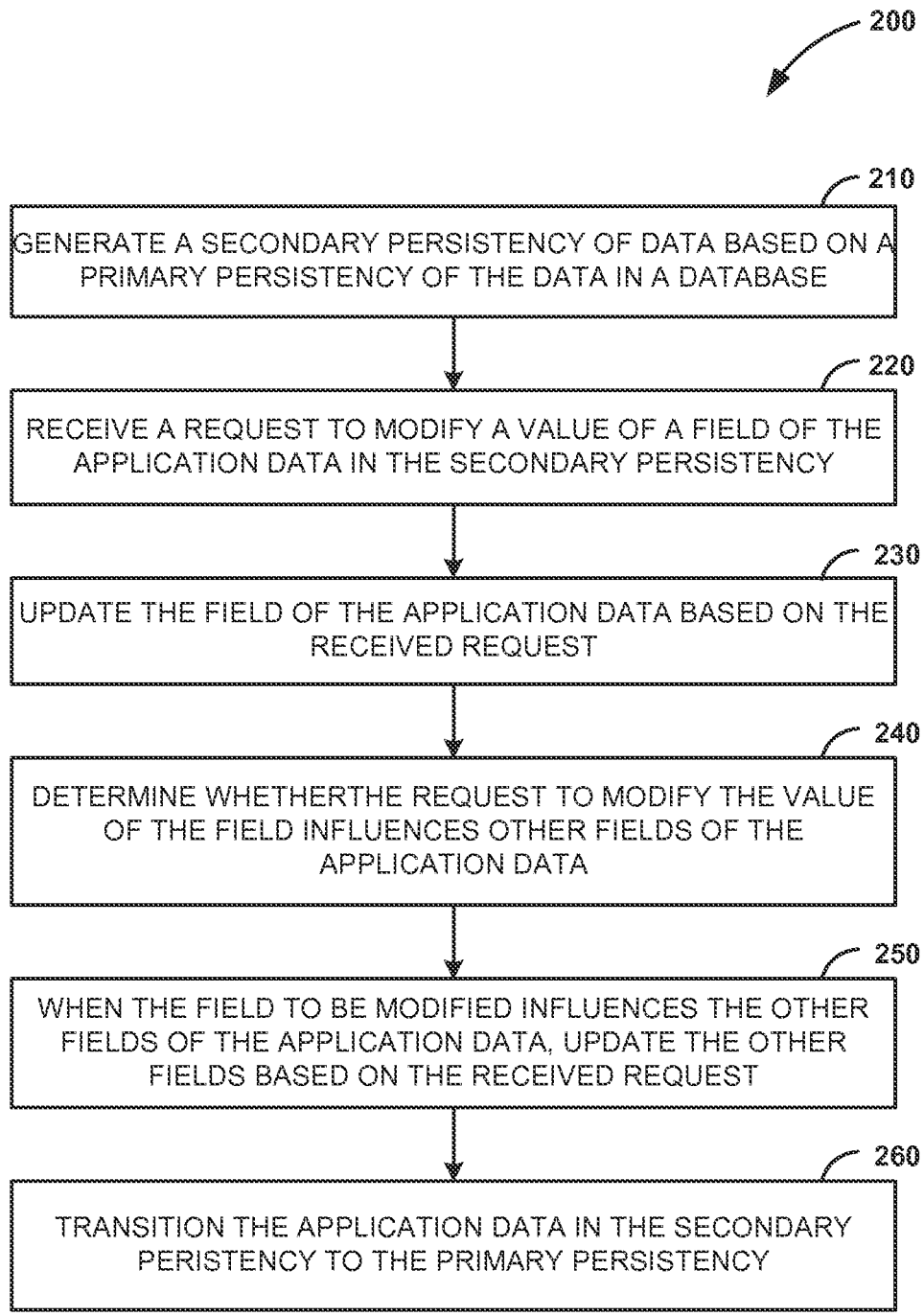
FIG. 2 is a flow diagram illustrating an example process to control interactions between an application user interface and a database, according to an embodiment.

FIG. 2 is a flow diagram illustrating process 200 to control interactions between an application user interface and a database, according to an embodiment. At 210, a secondary persistency of application data is generated based on a primary persistency of the application data in the database. The application data in the secondary persistency is herein also referred to as a draft of the application data. The application data may refer to data associated with multiple business objects and user interfaces corresponding to the business objects of a web-based application. The application data corresponding to a business object may include multiple fields. The fields may include simple fields and annotated fields. A simple field refers to a field that does not influence values of other fields of the application data when a value of the field is modified. An annotated field refers to a field that influences values of other fields based on a modification of the value of the field.

In an embodiment, the primary persistency is a database persistency that stores the application data for active usage, and can be accessed by end users of the web-based application. In an embodiment, the secondary persistency is a temporary storage for drafts of the application data. In an embodiment, backend and/or the database is associated with a data model corresponding to the application data. When the draft of the application data is generated, the data model is refreshed to add a document tree corresponding to the draft of the application data to the data model.

At 220, a request is received to modify the value of at least one field of the application data in the secondary persistency. For example, a transaction controller receives the request for modification from a developer through an application user interface (UI). The request may identify the field to be modified and a change to the value of the field.

At 230, the field of the application data is updated based on the received request. At 240, it is determined whether the request to modify the value of the field influences other fields of the application data according to a set of rules on the backend. For example, the transaction controller receives a request to modify a "Country" field having values "US" and "Germany". Based on the set of rules, the transaction controller may determine that the received request to modify the "Country" field influences a "Zip Code" field. The set of rules may include determination rules associated with the backend. The determination rules may be implemented via stored procedures at the backend, and may correspond to business rules associated with a business application of the web-based application. In an embodiment, a determination is made whether the field to be modified is annotated with a predefined annotation. An annotations document may be used to determine whether the field is an annotated field or a simple field. When the field is annotated, it is determined that the field to be modified influences other fields of the application data.

At 250, when it is determined that the field to be modified influences other fields of the application data, the other fields are updated based on the received request. For example, the transaction controller updates the value of the "Country" field and/or the "Zip Code" field based on the received request. In an embodiment, when the received request for modification does not influence other fields of the application data, just the field to be modified may be updated based on the received request.

At 260, the draft of the application data in the secondary persistency is transitioned to the primary persistency. In an embodiment, the draft of the application data is transitioned to the primary persistency in response to an activation request from a developer. The activation request moves the draft of the application data from the secondary persistency to active business data on the primary persistency. The draft that is moved from the secondary persistency to the active business data on the primary persistency is herein referred to as an activated document.

In an embodiment, transitioning the draft of the application data to the primary persistency includes providing a unique key, such as a database key associated with the draft of the application data to the database. In an embodiment, when the draft of the application data is transitioned to the primary persistency, the document tree corresponding to the draft of the application data is deleted from the data model. The activated document corresponding to the transitioned application data is then added to the data model.

In an embodiment, a set of operations corresponding to one request to the database is grouped in a logical unit of work to create a batch request. The batch request is then added to a request queue to transmit the batch request to the backend. The application user interface of an application accessing the database may be blocked, to prevent changes to the application data for a predefined period of time when the batch request is added to the request queue. In an embodiment, the modification to the value of the field is validated at client-side prior to transmitting the request to modify the value of the field to the backend. The request for modification may be prevented from being transmitted to the backend if errors are identified in response to the validation.

In an embodiment, a set of functions are provided for draft-enabled applications to communicate with the backend, as listed in table 1. These functions ensure the atomicity of operations sent to the backend. In one exemplary implementation, the transaction controller may be configured to implement these functions. However, the disclosure is not so limited, and other modules/elements in the system of FIG. 1 may be configured to implement these functions and additional functions without affecting the scope of the disclosure. These functions execute a given task without interaction with the user interface (UI), for example, by blocking the application UI or displaying messages on the application UI. As a result, these functions may be used by other functions that combine several tasks, or by application developers who need to develop customized application logic that does not follow orchestrated patterns. These functions return JavaScript Promises that allow chaining of tasks, although the tasks themselves are asynchronous. JavaScript Promises allow developers to associate handlers to the outcome of these tasks, and thus react on the success or failures of the tasks. The functions and the tasks the functions perform are listed in table 1 as follows:

TABLE 1

| Function | Task |
| --- | --- |
| Create Draft | Creates a secondary persistency of application data. The function requests for a new draft for a business object or entity, and returns the new draft; |
| Delete Draft | Deletes the draft. The function deletes either a new draft or an edited draft for an active document |
| Edit Draft | Creates a draft of an active document, and returns the draft for editing |
| Prepare Draft | Calls the prepare function import for a given draft that triggers determinations logic on the backend. For example, the function determines whether a value change of field A influences a value of field B |
| Validate Draft | Calls the validate function import for a given draft. The function is a read request and validates the determinations made during the preparation of the draft. The |

TABLE 1-continued

| Function | Task |
| --- | --- |
| | function returns a Boolean value in a HTTP response header indicating whether the validation is successful or not |
| Activate Draft | Calls the activate function import for the given draft, and returns the active document |
| Call Action | Calls the Open Data Protocol (OData) action for a given document with the required parameters, and returns the response of the action |
| Get Active Document | Reads the active document via a semantic key and returns the active document if available |
| Get Draft Document | Reads a draft document via a semantic key and returns the draft document if available |

The functions orchestrate the atomic operations for interacting with the backend in a manner that hides the complexity caused by draft-specific aspects from the developer, such as evaluation of annotations, semantics of actions related to tasks, etc. These functions also ensure transactional consistency and data integrity while interacting with the backend. Transactional consistency ensures that data written to the database in a transaction with the backend is valid according to defined rules of the database. When functions such as copy, prepare, and the like are performed on data, or value changes are made through the application UI, the tasks associated with these functions are queued and bundled in logical units of work. When actions are triggered, the transaction controller checks for pending changes and sends the pending changes to the backend, if required, before triggering action calls.

In an embodiment, the transaction controller ensures that the operations are processed in a sequential order to avoid locking conflicts when an optimistic locking approach is used. If a value change in the application UI requires further draft related actions, such as a "Prepare Draft" function call, the transaction controller executes these actions provided that appropriate annotations are given. In case of client validation errors, the transaction controller prevents requests to the backend as long as the errors persist. The transaction controller is configured to be aware of the business object hierarchy including the semantics of draft and non-draft actions that can cause side effects, and is configured to trigger refreshes on client data and the data model if required. Business object hierarchy refers to the hierarchy of business object nodes in the business object. The transaction controller evaluates draft-specific annotations that are used to execute methods for "Prepare Draft" call, "Edit Draft" call, "Validate Draft" call, and "Activate Draft" call. The transaction controller also obtains the semantics of function imports for these function calls.

In an embodiment, the functions included in the transaction controller are configured to combine or bundle different secondary tasks along with their corresponding primary tasks into one batch request. The batch request is then transmitted to the backend over the request queue. These secondary tasks are related to maintaining the transactional consistency while interacting with the backend. For example, these secondary tasks ensure that (i) the pending changes that are still in the data model are sent to the backend; (ii) the tasks are called in the correct sequence; (iii) the requests are placed in a batch request within the correct logical unit of work; (iv) the batch request is inserted into the request queue to ensure that previous requests are returned and upcoming tasks are canceled in case of a failure; (v) the data model is refreshed if required; and (vi) the application UI is blocked if required, and success and error messages are shown. These success and error messages may be parameterized by a caller application. Further, the functions return JavaScript Promises such that the caller application can react on success or failure of tasks. In an embodiment, the transaction controller analyzes warning messages, information messages and error messages within HTTP response headers received from the backend to determine the success or failure of the tasks.

FIG. 3 is a sequence diagram illustrating exemplary interactions 300 between application user interface (UI) 130 and database to generate a secondary persistency of application data, according to an embodiment. The sequence diagram represents the interactions and operations involved between the application UI 130, transaction controller 135, data model 310, for example, data model based on the OData protocol, and backend 105. The vertical lines of the application UI 130, the transaction controller 135, the data model 310, and the backend 105 represent the objects that may exist simultaneously. The horizontal arrows (e.g., 320, 330, 340, 350, 360, 370, and 380) represent the messages exchanged or interactions between objects, in the order in which they occur. The horizontal dashed lines represent reply messages. Activation boxes on the vertical lines represent that processes are being performed in response to the messages.

At 320, the transaction controller 135 receives a request to create a draft. As used herein, a draft refers to the secondary persistency of data corresponding to a business object, such as application data, based on the primary persistency of the data. At 330, the transaction controller 135 calls the "Create Draft" function to generate a "Create Draft" request to be added to the request queue. At 340, the transaction controller 135 adds a request for a refresh of the data model 310 to the request queue. The "Create Draft" function generates a batch request including a HTTP POST on the draft corresponding to the business entity or object. The batch request also includes a refresh of the data model 310 to ensure that the created draft is available in the data model 310. The draft is reflected as a node in the data model on the UI side. The node of a certain collection of the data model is created on the UI side, and the batch request for creation is then sent to the backend. The batch request is generated to execute more than one task in the correct sequence, and to maintain transactional consistency.

At 350, the "Create Draft" function blocks the application UI 130 to prevent changes to the draft of the application data for a predefined period of time. The application UI 130 is blocked for a predetermined period of time, for example, a few milliseconds in anticipation of changes to other portions of the business object resulting from the batch request. For example, changes to the value of field "Country" in the draft may influence the value of field "Zip Code" in the draft. The application UI is blocked to ensure that the developer cannot make changes to the draft until a response to the batch request is received. At 360, the "Create Draft" function adds the batch request to the request queue. At 370, the batch request is sent to the backend 105. The "Create Draft" function waits until the batch request is executed and handles the response to the batch request (e.g., showing a success or error message). The "Create Draft" function then informs the caller, e.g., the transaction controller 135 accordingly. At 380, if the generation of the new draft succeeds, a context is created and returned to the caller that binds the context to the application UI 130. In an example, the context refers to an Odata context that is used to bind the context to the application UI 130. Once the draft is generated, the draft may be updated, and may be activated upon request.

Figure 4A:
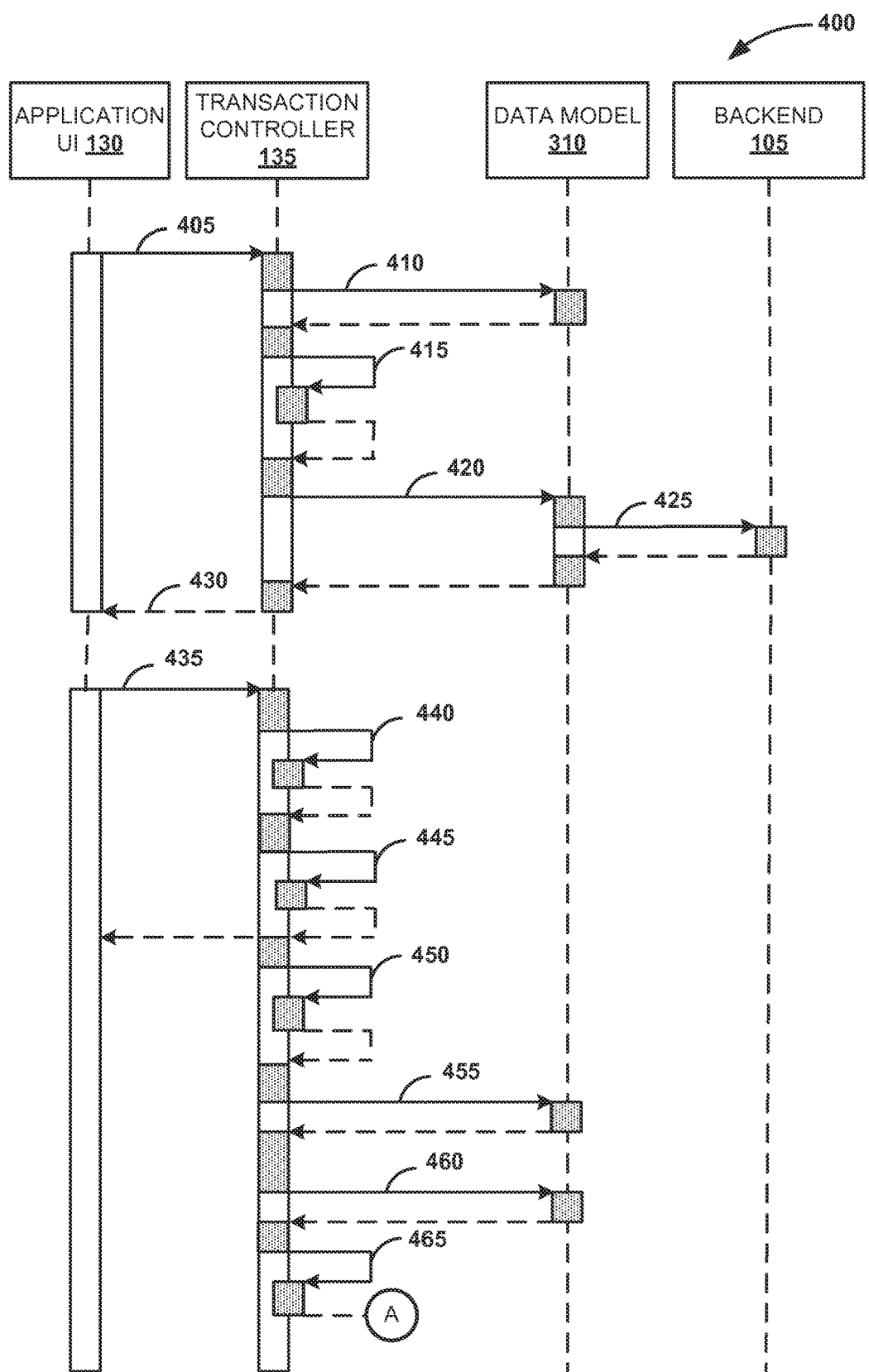
FIG. 4A is a sequence diagram illustrating exemplary interactions between an application user interface (UI) and a database to edit a secondary persistency of application data, according to an embodiment.
Figure 4B:
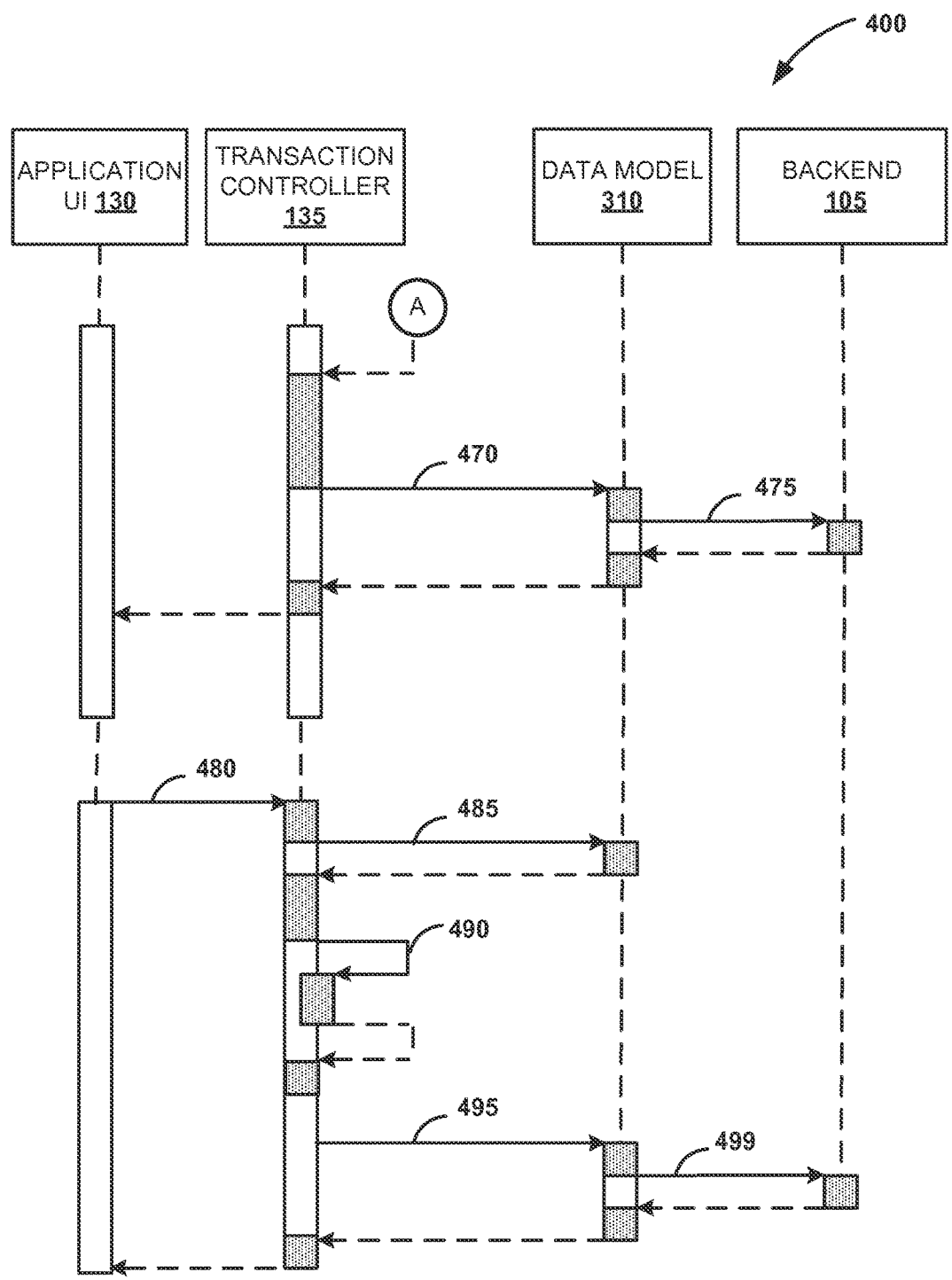
FIG. 4B is a sequence diagram illustrating exemplary interactions between an application user interface (UI) and a database to edit a secondary persistency of application data, according to an embodiment.

FIGS. 4A and 4B are sequence diagrams illustrating exemplary interactions 400 between application user interface (UI) 130 and database to edit the secondary persistency of the application data, according to an embodiment. In an exemplary embodiment, a draft is generated for an active document on the primary persistency. The active document may correspond to an active business object on the database that can be accessed by end users.

At 405, transaction controller 135 receives a request to edit a draft. At 410, the transaction controller 135 calls an "Edit Draft" function to generate an "Edit Draft" request to be added to the request queue. In an example, the transaction controller 135 calls the "Edit Draft" function when the developer wants to edit a document corresponding to a specific business object. A batch request, including a call for the edit action to a given business entity or object, is created. At 415, the "Edit Draft" function blocks application UI 130 to prevent changes to the draft of the application data for a predefined period of time. At 420, the "Edit Draft" function 135 adds the batch request to the request queue. At 425, the batch request is sent to backend 105. The "Edit Draft" function waits until the batch request is executed and handles the response to the batch request (e.g., showing a success or error message). The "Edit Draft" function then informs the caller, e.g., the transaction controller 135 accordingly. At 430, if the generation of the draft for the given entity or object succeeds, a context is created and returned to the caller that binds the context to the application UI 130.

At 435, the transaction controller 135 receives an input from the developer to modify a value of a field of the draft. In an exemplary implementation, the changes made by the developer are transmitted immediately to the backend 105, for example, via HTTP PUT or Merge requests. These chances are saved in the draft or secondary persistency on the backend 105 to prevent data loss. At 440, the "Edit Draft" function checks whether a client-side validation failed in response to the input and whether client-side errors exist. For example, the "Edit Draft" function checks for client-side errors in response to the input at the application UI 130, such as, invalid date entry, data type error, etc. At 445, if client-side errors exist, the transaction controller 135 displays the errors on the application UI 130, such as, invalid date entry, data type error, etc., and blocks the request queue. If client-side errors do not exist, the flow proceeds to 450.

At 450, the transaction controller 135 checks whether the field to be modified is annotated using an annotations document. If annotations (e.g. side-effect annotations) are set to the field to be modified, the transaction controller 135 is configured to determine other fields in the draft that are influenced in response to the user input to modify the field. The transaction controller 135 uses a "Prepare Draft" function to control and modify other fields in the draft that are influenced in response to the user input. At 455, if the field is annotated with an annotation, the "Prepare Draft" function is added to the request queue.

At 460, a refresh of data model 310 is added to the request queue if the annotation is set, since the "Prepare Draft" function performs determinations that could have side-effects to the entire draft (e.g., draft header and items). The transaction controller 135 tracks the value changes at the application UI 130 and checks whether the field or a property is annotated with annotations. For example, the draft is associated with a hierarchical business object model, and the draft includes a draft root and draft nodes. The changes to a value on the draft root may influence the values at an item/node level, and vice versa. For instance, the draft may correspond to draft root "sales order", which includes sales order items. When a value is changed at sales order level, the change in the value may influence values at sales order item level. Thus, the refresh of the data model 310 ensures that the draft root and the draft items are refreshed in order to obtain updated data from the backend 105.

At 465, the application UI 130 is blocked until a response to the request is returned, due to the fact that the "Prepare Draft" function call causes changes to the field, and controls and changes other field values due to a set of rules at the backend 105. The set of rules may include determination rules associated with the backend 105. For example, if an update request is sent to cause a change in a "Country" field having values "US" and "Germany", a "Zip Code" field may or may not be displayed based on the value in the "Country" field. In such situations, the developer is not allowed to make changes to the draft by blocking the application UI 130 till a response to the update request is returned. In an example implementation, the determination rules are implemented via stored procedures in the advanced business application programming (ABAP) platform and/or SAP's High-Performance Analytic Appliance (HANA) platform.

At 470, the "Edit Draft" function transmits the batch request with the pending changes, or the batch request with the pending changes and the "Prepare Draft" function for the draft of the application data. The "Edit Draft" function transmits the batch request over the request queue. At 475, the batch request is sent to the backend 105. The "Edit Draft" function waits until the batch request is executed and handles the response to the batch request (e.g., showing an error message in case of failure). The "Edit Draft" function then informs the caller, e.g., the transaction controller 135 accordingly.

Once the developer is satisfied with the changes to the draft, the developer may activate the draft through the application UI 130. In an exemplary implementation, the activation request may be bundled with other tasks, such as the edit and prepare tasks, and thus may be machine-triggered. At 480, the transaction controller 135 receives a request to activate the draft. The activation request moves the draft of the application data from the secondary persistency to active business data on the primary persistency. The draft that is moved from the secondary persistency to the active business data on the primary persistency is herein referred to as the activated document. The draft may be activated by calling an "Activate Draft" function. The "Activate Draft" function creates a batch request including a call of an activate action for the draft. The batch request may also include a request to refresh the data model 310 to ensure that the document tree corresponding to the draft is deleted from the data model 310, and the activated document is added to the data model 310. At 485, the "Activate Draft" function adds a request to refresh the data model 310. At 490, the "Activate Draft" function blocks the application UI 130. At 495, the "Activate Draft" function transmits the batch request over the request queue. A 499, the batch request is sent to the backend 105. The "Activate Draft" function waits until the batch request is executed and handles the response to the batch request (e.g., showing a success message or error message). The "Activate Draft" function then informs the caller, e.g., the transaction controller 135 accordingly. If the activation succeeds, the context for the activated document is created and returned to the caller that binds the context to the application UI 130.

Figure 5:
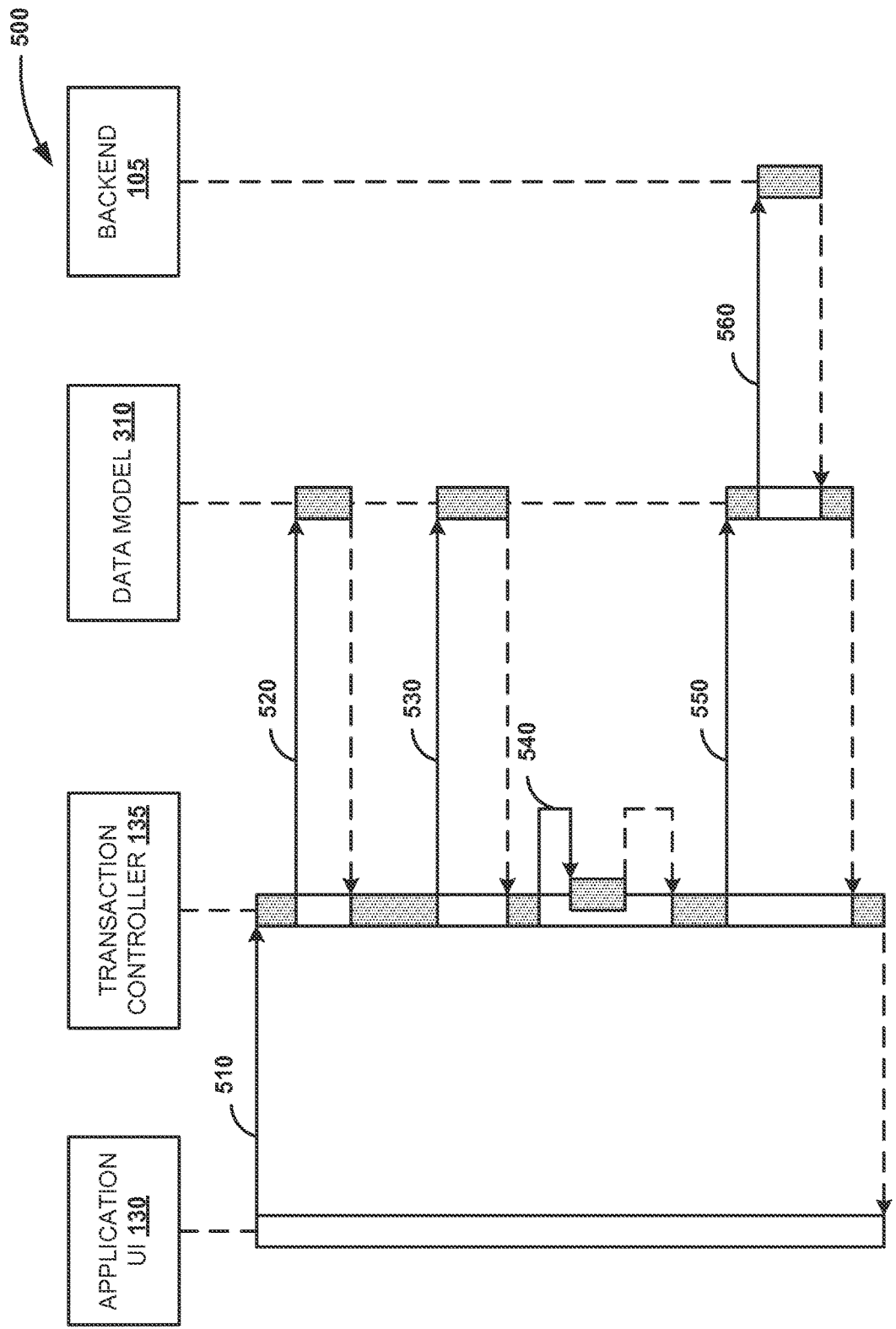
FIG. 5 is a sequence diagram illustrating exemplary interactions between an application user interface (UI) and a database to delete a secondary persistency of application data, according to an embodiment.

FIG. 5 is a sequence diagram illustrating exemplary interactions 500 between application user interface (UI) 130 and database to delete a secondary persistency of application data, according to an embodiment. At 510, transaction controller 135 receives a request to delete a draft. The transaction controller 135 calls a "Delete Draft" function that creates a batch request including a HTTP Delete of the draft. The batch request may also include a request to refresh the data model 310 to ensure that the document tree corresponding to the deleted draft is deleted from the data model 310. At 520, the transaction controller 135 adds the "Delete Draft" function call to a request queue to create the batch request for deleting the draft. At 530, the "Delete Draft" function adds the request to refresh the data model 310. At 540, the "Delete Draft" function blocks application UI 130. At 550, the "Delete Draft" function transmits the batch request over the request queue. At 560, the batch request is sent to backend 105. The "Delete Draft" function waits until the batch request is executed and handles the response to the batch request (e.g., showing a success message or error message). The "Delete Draft" function then informs the caller, e.g., the transaction controller 135 accordingly.

In an exemplary implementation, the transaction controller 135 employs a "Call Action" function to analyze the metadata and annotations associated with the business objects, such as the application data. In an exemplary embodiment, the "Call Action" function may be bundled with other tasks such as edit and prepare tasks that require analysis of the metadata and annotations associated with the business objects. The "Call Action" function creates a batch request including the call of an action associated with a data service with required parameters. The "Call Action" function blocks the application UI 130, transmits the batch request over the request queue and waits until the batch request is executed. The "Call Action" function handles the response to the batch request (e.g., showing a success message or error message), and informs the caller, e.g., the transaction controller 135 accordingly.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programmer protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on an article of manufacture including a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming languages and development tools. Another embodiment may be implemented in hard-wired circuitry in place of or in combination with machine readable software instructions.

Figure 6:
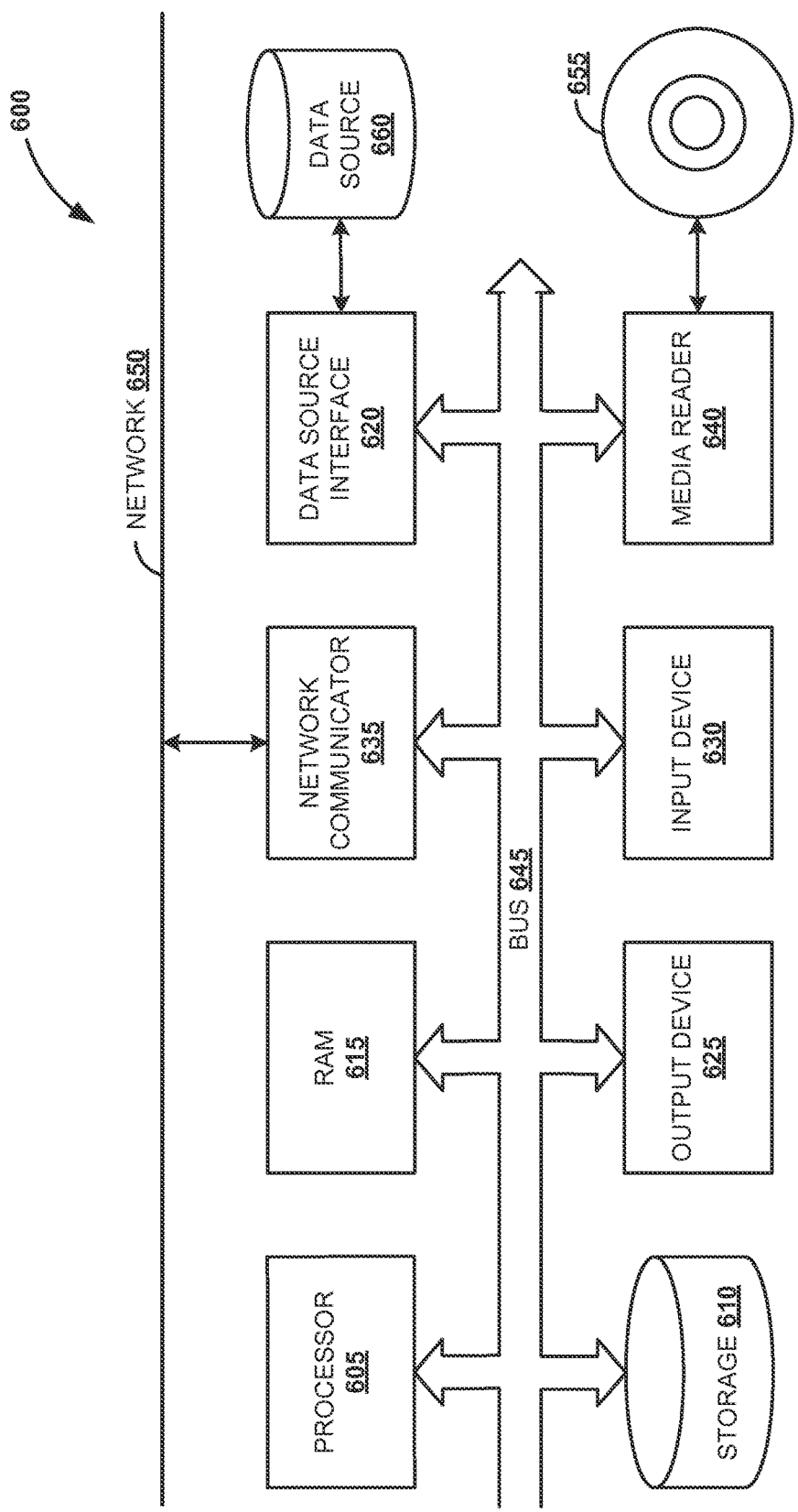
FIG. 6 is a block diagram illustrating an exemplary computer system, according to an embodiment.

FIG. 6 is a block diagram illustrating an exemplary computer system 600, according to an embodiment. The computer system 600 includes a processor 605 that executes software instructions or code stored on a computer readable storage medium 655 to perform the above-illustrated methods. The processor 605 can include a plurality of cores. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. According to some embodiments, such as some in-memory computing system embodiments, the RAM 615 can have sufficient storage capacity to store much of the data required for processing in the RAM 615 instead of in the storage 610. In some embodiments, all of the data required for processing may be stored in the RAM 615. The stored instructions may be further compiled to generate other representations of the instructions and dynamically stored in the RAM 615. The processor 605 reads instructions from the RAM 615 and performs actions as instructed. According to one embodiment, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. One or more of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., online analytical processor (OLAP)), object oriented databases, and the like. Further, data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the embodiments are described herein for illustrative purposes, various equivalent modifications are possible within the scope of the embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. An article of manufacture including a non-transitory computer readable storage medium having stored thereon executable instructions, which when executed by a processor cause the processor to perform a method, the method comprising:

generating, by a creation component, a secondary persistency of application data based on a primary persistency of the application data in a database, the application data being a target of a data request in an application, the second persistency being a data snapshot of an intermediate state of active data on the primary persistency;

receiving, from a computer generated user interface, a request to modify a value of a field of the application data in the secondary persistency;

updating, by an editing component, the field of the application data in the secondary persistency in response to the received request for modification to create a second application data persistency, the updating of the secondary persistency not affecting active data content on the primary persistency;

determining, by the editing component, that the received request for modification influences one or more other fields of the second application data persistency according to a set of rules, the determining including:

determining whether the field is annotated with a predefined annotation using an annotations document; and when the field is annotated, determining that the received request for modification influences the one or more other fields of the application data according to the set of rules;

updating, by the editing component, the one or more other fields of the second application data persistency based on the received request without affecting the active data on the primary persistency; and transitioning, by an activation component, the second application data persistency from the secondary persistency to the primary persistency.

2. The article of manufacture of claim 1, wherein the database is associated with a data model corresponding to the application data, and wherein upon generating the secondary persistency of the application data, further comprising instructions to refresh the data model to add a document tree corresponding to the secondary persistency of the application data to the data model.

3. The article of manufacture of claim 1, further comprising instructions to:

transmit a request to the database to validate changes to the one or more other fields of the application data; and receive a response indicating whether the changes are validated.

4. The article of manufacture of claim 1, wherein transitioning the application data in the secondary persistency to the primary persistency further comprises deleting a document tree corresponding to the secondary persistency of the application data from a data model.

5. The article of manufacture of claim 1, wherein the application data in the secondary persistency is transitioned to the primary persistency in response to a user request.

6. The article of manufacture of claim 1, further comprising instructions to: group a set of operations corresponding to a request to the database in a logical unit of work to create a batch request, wherein the batch request is added to a request queue to transmit the batch request to the database.

7. The article of manufacture of claim 6, further comprising instructions to: block a user interface of an application accessing the database to prevent changes to the application data for a predefined period of time and to add the batch request to the request queue.

8. The article of manufacture of claim 1, further comprising instructions to: when the one or more other fields of the application data are not influenced based on the received request for modification, update the field of the application data based on the received request.

9. The article of manufacture of claim 1, further comprising instructions to: validate the modification to the value of the field prior to transmitting the received request to the database, and prevent the received request from being transmitted to the database if errors are identified in response to the validation.

10. A computer-implemented system to control interactions between an application user interface and a database, comprising:

a processor configured to read and execute instructions stored in one or more memory elements; and the one or more memory elements storing instructions to:

generate a secondary persistency of application data based on a primary persistency of the application data in the database, the application data being a target of a data request in an application, the second persistency being a data snapshot of an intermediate state of active data on the primary persistency;

receive, from a computer generated user, a request to modify a value of a field of the application data in the secondary persistency;

update the field of the application data in the secondary persistency in response to the received request for modification to create a second application data persistency, the updating of the secondary persistency not affecting active data content on the primary persistency;

determine that the received request for modification influences one or more other fields of the application data according to a set of rules, the determination including:

determine whether the field is annotated with a predefined annotation using an annotations document; and when the field is annotated, determine that the received request for modification influences the one or more other fields of the application data according to the set of rules;

update the one or more other fields of the second application data persistency based on the received request without affecting the active data on the primary persistency; and transition the second application data persistency from the secondary persistency to the primary persistency.

11. The computer-implemented system of claim 10, wherein the database is associated with a data model corresponding to the application data, and wherein upon generating the secondary persistency of the application data, further comprising instructions to refresh the data model to add a document tree corresponding to the secondary persistency of the application data to the data model.

12. The computer-implemented system of claim 10, further comprising instructions to:

transmit a request to the database to validate changes to the one or more other fields of the application data; and receive a response indicating whether the changes are validated.

13. The computer-implemented system of claim 10, wherein the database is associated with a data model corresponding to the application data, and wherein transitioning the application data in the secondary persistency to the primary persistency further comprises instructions to delete a document tree corresponding to the secondary persistency of the application data from the data model.

14. The computer-implemented system of claim 10, wherein the application data in the secondary persistency is transitioned to the primary persistency in response to a user request.

15. The computer-implemented system of claim 10, further comprising instructions to: group a set of operations corresponding to a request to the database in a logical unit of work to create a batch request, wherein the batch request is added to a request queue to transmit the batch request to the database.

16. The computer-implemented system of claim 15, further comprising instructions to: block a user interface of an application accessing the database to prevent changes to the application data for a predefined period of time and to add the batch request to the request queue.

17. The computer-implemented system of claim 10, further comprising instructions to: validate the modification to the value of the field prior to transmitting the received request to update the field to the database, and prevent the received request from being transmitted to the database if errors are identified in response to the validation.

18. A computer-implemented method to control interactions between an application user interface and a database, the method comprising:
   generating, by a processor of a computer, a secondary persistency of application data based on a primary persistency of the application data in a database, the application data being a target of a data request in an application, the second persistency being a data snapshot of an intermediate state of active data on the primary persistency;
   receiving, from a computer generated user interface, a request to modify a value of a field of the application data in the secondary persistency;
   updating, by the processor, the field of the application data in the secondary persistency in response to the received request for modification to create a second application data persistency, the updating of the secondary persistency not affecting active data content on the primary persistency;
   determining, by the processor, that the received request for modification influences one or more other fields of the application data according a set of rule, the determination including:
      determining whether the field is annotated with a predefined annotation using an annotations document; and
      when the field is annotated, determining that the received request for modification influences the one or more other fields of the application data according to the set of rules;
   updating, by the processor, the one or more other fields of the second application data persistency based on the received request without affecting the active data on the primary persistency; and
   transitioning, by the processor, the second application data persistency from the secondary persistency to the primary persistency.

* * * * *